UNITED STATES PATENT OFFICE.

RICHARD KIRCHHOFF, OF BERLIN, GERMANY, ASSIGNOR TO THE ACTIEN-GESELLSCHAFT FÜR ANILIN FABRIKATION, OF SAME PLACE.

CRIMSON AZO DYE.

SPECIFICATION forming part of Letters Patent No. 512,116, dated January 2, 1894.

Application filed March 18, 1893. Serial No. 466,711. (Specimens.)

*To all whom it may concern:*

Be it known that I, RICHARD KIRCHHOFF, of Berlin, in the Kingdom of Prussia, German Empire, have invented new and useful Improvements in the Production of Crimson Azo Dyes; and I do hereby declare that the following is a full, clear, and exact description of the invention, which will enable others skilled in the art to which it appertains to make and use the same.

The invention relates to a new dyestuff, which is prepared by first combining para-diazobenzenesulfo acid as described in United States Patent No. 256,381, dated April 11, 1882, with ortho-anisidin, diazotizing the amidoazo compound

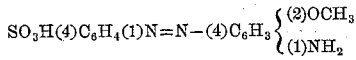

obtained in this way and reacting with this diazotized product upon beta naphtol alpha monosulfo acid.

I give in the following an example for the production and a description of the properties of my new dyestuff. 17.3 kilos sufanilic acid are diazotized by means of seven kilos nitrite of soda and twelve kilos hydrochloric acid (20° Baume). The diazobenzenesulfo acid is caused to react upon 12.3 kilos ortho-anisidin, finely suspended in water; after stirring energetically for some hours six kilos hydrochloric acid, and after further twelve hours again nine kilos hydrochloric acid are added. The amidoazo compound, separated in the shape of a violet-black crystalline powder, is filtered off; it may be purified by transformation into lime or soda salt and precipitation from this solution with mineral acids. Such a quantity of this amidoazo compound as corresponds to seven kilos nitrite of soda is diazotized in acidulated aqueous solution; the diazo compound separates almost entirely in the shape of reddish crystalline needles. It is poured slowly into a solution of twenty-four kilos beta naphtol alpha monosulfonate of soda, kept alkaline during the reaction by means of carbonate of soda. A deep crimson solution is formed in this way, from which after heating to about 50° centigrade the new dyestuff is precipitated by the addition of salt. The dyestuff forms a red-brown powder, which is readily soluble in water with a bright red color, that turns into violet by the addition of caustic soda lye; in the dyestuff solution mineral acids produce a dark red-brown precipitate of the free color acid, which when separating from a hot solution, shows a green metallic luster. The dyestuff is quite soluble in alcohol but insoluble in ether. In concentrated sulfuric acid it produces a green-blue solution, which on diluting with water changes at first into violet and then separates the free color acids in the shape of red-brown flakes.

The coloring matter dyes wool and silk in an acidulated bath a crimson shade; it may be also fixed on cotton in a dye bath containing alum or alumina-salts.

Having now described my invention and in what manner it is to be carried out, what I claim as new, and desire to secure by Letters Patent, is—

1. The process for the production of a new red dyestuff by combining paradiazobenzenesulfo acid with ortho anisidin, further diazotizing the amidoazo compound thus obtained and subsequently combining the rediazotized product with beta naphtol alpha monosulfo acid, substantially as described.

2. The new dyestuff hereinbefore described which corresponds to the formula

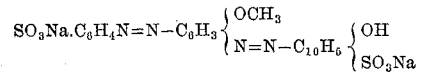

and which forms in dry state a red brown powder, easily soluble in water with a red color, more difficultly soluble in alcohol, insoluble in ether, dissolving with green blue shade in strong sulfuric acid, which solution on diluting with water turns violet and then separates the free color acid.

In testimony whereof I hereunto set my hand and affix my seal, in the presence of two witnesses, this 17th day of February, A. D. 1893.

RICHARD KIRCHHOFF. [L. S.]

Witnesses:
REINHOLD SCHÖNBRODT,
GUSTAV LUCHT.